June 1, 1943. C. K. GIERINGER ET AL 2,320,587

KYMOGRAPH GRID

Filed March 11, 1941

INVENTORS
Carl K. Gieringer
BY Elbert E. Greenberg
Wood, Arey, Herron & Evans
ATTORNEYS Patented June 1, 1943

2,320,587

UNITED STATES PATENT OFFICE 2,320,587

KYMOGRAPH GRID

Carl K. Gieringer and Elbert E. Greenberg, Cincinnati, Ohio, assignors to The Liebel-Flarsheim Company, Cincinnati, Ohio, a corporation of Ohio Application March 11, 1941, Serial No. 382,768

9 Claims. (Cl. 250—65)

This invention relates to kymography and is directed solely to improvements of the grids employed in the machines which are utilized in this X-ray technique.

The principal object of the invention, briefly, has been to provide grids which enable clearer, sharper X-ray photographs to be obtained than those provided by the grids available at present. However, since the art of kymography is new and not generally well known at the present time, a brief description of the kymograph and the manner in which it is used is helpful in understanding the nature of the present advance.

Roentgen kymography is a photographic method of recording the physiological movements of an organ of the body, such as the heart or diaphragm. The photographic record is obtained upon a single X-ray film and therefore the cycle of movement of a given area and the phase relationship of the movements of different areas in a given locality may be studied for diagnostic purposes.

The procedure is a relatively simple one. A suitable source of X-rays is placed at one side of the body substantially in line with the organ to be scrutinized and a photographic film is placed at the other side. A large sheet of lead which is impervious to X-rays is placed intermediate the body and the film but this sheet has a plurality of narrow slots at spaced intervals through which X-rays are free to pass. This sheet is called the grid.

To take a kymographic picture the grid is held stationarily and the photographic film or plate behind the grid is moved slowly, during a single continuous exposure, through a distance which is slightly less than the space between the slots in the grid. Thus, the kymographic picture is divided into frames of images. These collectively depict the movement of the areas at the border of the organ which overlie the slit during the film movement.

The kymograph, that is the machine itself, is comprised of the grid, a film holder or cassette behind the grid for holding the film during the exposure period, and a motor mechanism for moving the cassette through the limited range of movement at a timed rate of speed. The cassette usually is counterbalanced to obtain desirable smoothness of movement, and a timer sometimes also is employed to provide a time record on the film so that total and relative time studies can be made. Usually the apparatus is mounted on a stand so that it can be adjusted to various positions with respect to a patient's body. A conventional X-ray machine is used to provide the X-rays.

Since the film moves at a uniform rate, all points on any wave that are equidistant from the standard reference lines at the bottom of each image frame occur at the same moment and, by measuring these distances in the various frames, it is possible statistically to determine time relationships in the movement of the various portions of the organ. This capability has made kymography particularly useful to the cardiologists.

In the grid of the kymograph, to which the present invention particularly is directed, the slits are spaced equally, for instance, every 6, 12 or 18 mm. apart and each slit is of equal width, for instance, 0.4 mm. or thereabouts. The cassette is moved a distance less than the slit spacing, for instance, 5, 11 or 17 mm., so that there is no overlapping of the image frames. The lead of which the grids are made is thick enough to be opaque to the passage of X-rays, so that the only X-rays impinged upon the film are those passing through the slit areas during the exposure period.

Since the kymograph record must be carefully interpreted to provide any useful diagnostic result, it is requisite that it be clear and accurate. Measurements of small distances are required and for this reason the images must be sharp and well defined and of good contrast; a fuzzy, indistinct image makes interpretation difficult and unreliable.

Image indefiniteness is due largely to the fact that, in addition to the X-rays which come through the organ to the film directly from the X-ray tube, some rays are reflected and some generated in the tissue by the primary beam as they pass through the patient tissue. This scattered radiation strikes the film at angles other than the angle of the primary beam. These scattered rays cause an overlying fog or haze which reduces the contrast of the image and obscures detail and definition. This scattered or secondary radiation may be as much as three to ten times the primary radiation striking the film, depending upon the nature of the tissue and the patient spacing in the exposure field. The grids available at present do not provide the clarity and contrast which is requisite before kymography can be utilized to its fullest extent as a diagnostic tool.

The present invention is predicated upon the determination that the film fogging effects and the blurring caused by secondary radiation can be substantially eliminated by the use of grids in which the slits are of predetermined profile and dimension. It has been discovered that while the total amount of secondary radiation passing through the slits of the grid impinging upon the film may be very appreciable in relation to the total, it is the oblique rays which cause fogging and blurring of the image. When these oblique radiations are blocked from the screen the fog is eliminated and the desired contrast and definition are obtained.

The acceptance angle, that is the angle between a medial line passing through the slit and the most oblique path along which radiation may travel and still enter the slit, varies with the slit width, the thickness of the lead bounding the slit and the profile of the slit. The fact has now been uncovered that if the acceptance angle, that is, the angle between a medial line passing through the slit and the most oblique path along which a ray may travel and still pass through the slit, be an angle whose tangent is substantially .25 or less, then, substantially regardless of all other factors, the blurring and poor image definition are prevented and the desirable contrast of the film image is obtained. This characteristic, then, typifies the kymographic grids of the present invention.

The acceptance angle may be designated $\theta$ and it is controlled and limited by the width of the slit, the thickness of the lead bounding the slit and the slit profile. The drawing illustrates various grid formations in accordance with the present invention which provide the desirable results.

Figure 1:
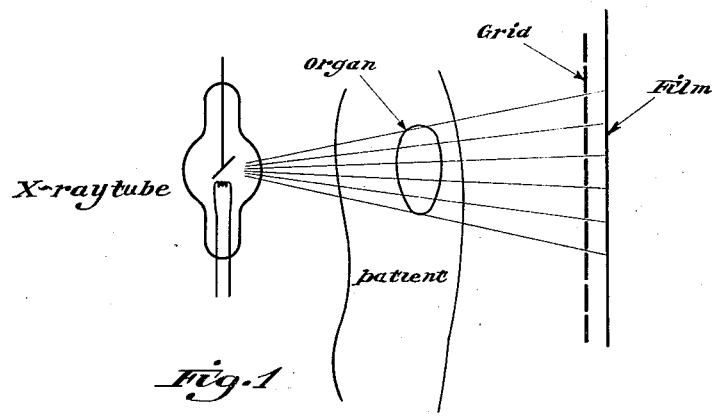
Figure 1 is a diagrammatic view showing a typical arrangement of a kymograph to a patient and a source of X-rays.

The grid element shown diagrammatically in Figure 1 is arranged intermediate the patient and the film so as to block the passage of X-rays to the film except through the slits of the grid. Rays emanating from the X-ray tube at the opposite side of the patient pass through the patient, through the organ of the patient which the doctor desires to scrutinize, thence through the slits in the grid and to the film.

In the present commercial machines the grid is stationary as previously described and the film moves relative to the grid a distance slightly less than the spacing of the slots therein. It will be understood, however, that if desirable the film may be held stationary and the grid be moved. The rays emanating from the focus of the X-ray tube, as shown in Figure 1, diverge, and in setting up the apparatus the doctor usually tries to have the parts relatively located, so that a ray passing from the focus of the X-ray tube through the central part of the organ strikes the grid and film at an angle approximately normal thereto. Some of the rays of this direct radiation, for instance the rays passing through the border parts of the organ, actually impinge upon the grid and film at oblique angles.

Figure 2:
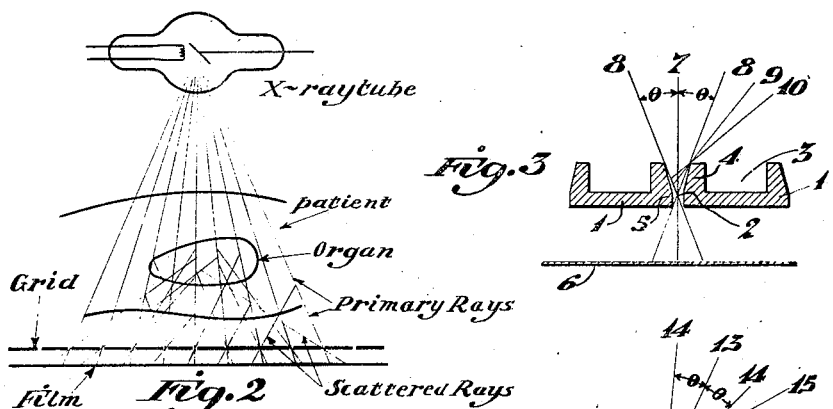
Figure 2 is a diagrammatic view showing the origin of secondary and the scattering of X-rays passing through a patient.

As shown in Figure 2, however, some of the direct radiation is scattered and these scattered rays may pass through the grid to strike the film at very oblique angles. For instance, one of the primary beams at the center of the field may be scattered and the secondary radiation thus produced may pass through a remote slot which is intended to permit the passage of direct radiation at the border of the field of emanations. This scattering of the rays is the source of the fogging and obscuring of the photographic image.

Figure 3:
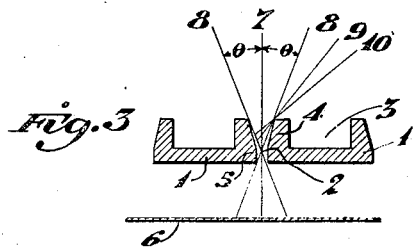
Figure 3 is a cross sectional view taken through a portion of a typical grid constructed in accordance with the present invention.

A typical embodiment of the present invention is shown in the arrangement of the grid strips 1 in Figure 3. These strips are of lead or a material which is opaque to X-rays. They are arranged alongside one another in parallel relationship, and their length is such that the entire width of the grid is sufficient to cover the width of the field of investigation.

For illustration purposes, only two adjacent of these strips are shown in Figure 3; it will be understood that a plurality of them is used in the assembly of a commercial grid.

The strips 1 are spaced apart from one another to provide the slit indicated generally at 2, through which X-rays may pass between the strips, and the central portion of each strip is cut away longitudinally as at 3 so as to reduce the weight of the total assembly.

The edges of each strip are chamfered oppositely as at 4 so that the walls of the slit essentially constitute a V-shaped groove which is open at the bottom the slit width. The chamfering preferably does not extend to the underneath face of each strip because of the tendency of the chamfering to leave feather edges which are not absolutely true and sharp; these would cause a variation in the width of each slit throughout its length. Instead each edge includes a substantially perpendicular wall portion 5 which extends a short distance beyond the face of the strip and the remainder of the edge is constituted by the chamfered wall portion 4. The chamfering at the grid edges enables the grid to be moved through a limited distance relative to the film and patient without cutting off the primary beam emanations. The chamfering also makes it possible to provide for acceptance of primary beams striking the grid assembly at different angles at different portions so that the axis of each slot need not be angulated exactly according to the angle of incidence of the primary beam it is to receive.

The film beneath the grid constituted by the lead strips 1 is indicated at 6 and for purposes of illustration the ray 7 is indicated as a ray which passes medially through the slot of the grid. The rays 8 are the rays which are most oblique with respect to the ray 7 and which still may pass through the slot. Thus, either of the rays 8 just pass inwardly of the upper edge of the grid slot and likewise just pass inwardly of the lower edge of the grid slot, and they therefore pass through the slot and their images are recordable upon the photographic film. It will be seen that the rays 9 and 10 are more oblique to the medial ray 7 than the rays 8. The passage of these rays through the slot is obstructed by the walls of the grid strips which define the slit. Each of these rays 9 and 10 strikes the grid strips and their passage to the photographic film is therefore obstructed.

It will be seen that the angle θ between the medial ray 7 and the rays 8 which are most oblique to the medial ray and which is still capable of passing through the slot, is an angle which will vary in accordance with the width of the slit, the height of the grid strips at the slits, and the angularity of the chamfering of the slit walls. All of these dimensions may be varied at will as will readily be understood. However, in accordance with the present invention, it has been determined that regardless of the variations in these dimensional characteristics, if the angle θ be between the medial ray 7 and the rays 8 which are most oblique to the medial ray and are still capable of passing through the slit be an angle whose tangent is not substantially greater than .25, then the blurring effects which are caused by scattering of the rays or the secondary radiation are substantially eliminated and the desired contrast and definition of the image are obtained. This is true whether the medial ray 7 be a ray which is substantially perpendicular to the film 6 or if the ray 7 be itself actually oblique relative to the film.

Grid strips having the general configuration of those shown in Figure 3 are used to best advantage in the central part of a grid through which the rays pass which are substantially perpendicular to the photographic film.

Figure 4:
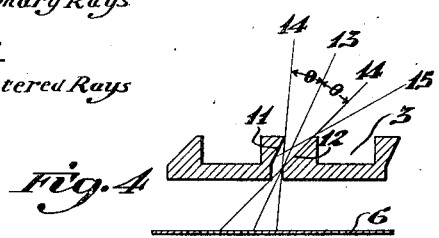
Figure 4 is a view similar to Figure 3 showing a modified form of grid made in accordance with the present invention.

Grid strips of the configuration of those shown in Figure 4 are of a type desirable for use at the extremities of a grid; that is, their slot configurations are arranged to best advantage for the passage of primary radiation which is oblique relative to the photographic film. The grid strips of Figure 4 have the central groove 3, but in this case the one edgewise wall is chamfered inwardly as at 11 and the other edgewise wall is chamfered outwardly as at 12. When a pair of these strips are arranged in spaced relationship, as shown in Figure 4, their wall configurations likewise constitute a V-shaped groove which is open at its bottom, but the medial axis of this groove is at an angle which is oblique to the plane of the photographic film, or for that matter, at an angle which is oblique to the plane in which the grid strips are arranged. In the configuration of the grid strips of Figure 4 it is desirable as previously described to terminate the chamfered portions in spaced relationship to the underneath faces of the strips, so as to avoid the difficulty of feathering of the edges.

It will be understood that the assembly of grid strips of the type shown in Figure 4 may be arranged relatively oppositely at the respective ends of a central assembly of grids of the type shown in Figure 3, so that the passage of oblique direct radiation at the opposite sides of the central normal direct beam is facilitated. Better still, the grid assembly may be comprised of groups of grids arranged so that the axes through the slots in each zone or group reside approximately at the angle of incidence of primary radiation striking that portion of the grid assembly.

In this modification, as in the previous case, the ray 13 represents the ray passing medially through the slot. The rays 14—14 are the rays which are most oblique to the medial ray and are still capable of passing through the slit. The rays 15 are the rays which are still more oblique and are not capable of passing the slot, being obstructed by absorption in the grid strips intermediate the slots. Likewise, in this case the angle θ is an angle between the medial ray 13 and either of the oblique rays 13 whose tangent is not substantially greater than .25.

Lead strips of the type which are desirable for use in grid manufacture are long and thin and relatively flimsy, and it is desirable to mount them upon a backing of composition board or the like through which X-rays may freely penetrate. The backing functionally need not be any more than a carrier for the strips. Grid strips of the type shown in Figures 3 and 4 may be formed most easily by the extrusion process, the long strips provided thereby being cut into unitary lengths for assembly.

Figure 6:
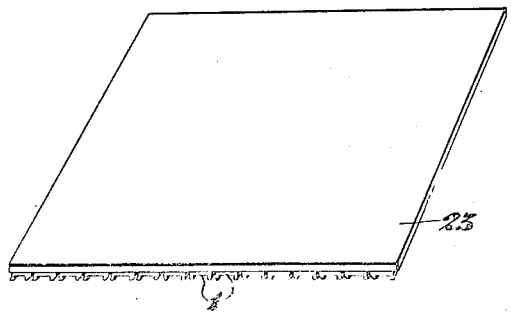
Figure 6 illustrates a perspective view of a form of commercial grid constructed in accordance with the present invention.

In the grid structure of Figure 6 plain rectangular strips are utilized. These are placed at relatively opposite sides of the carrier 16 and they are spaced apart relative to one another at the opposite sides of the carrier, so that X-rays may pass through the base piece at the area between the cooperating strips. In Figure 6 the medial beam is indicated at 17 and the rays most oblique to the medial beam are indicated at 18—18.

The grid strips 19 may be spaced apart from one another to provide the upper slots 20 and the grid strips 21 at the other side of the carrier may be spaced apart to provide the lower slots 22. The positioning of the strips at the opposite sides of the carrier is such that the upper slots 20 may coincide with the lower slots 22 to facilitate the passage of direct radiation substantially perpendicular to the plane of the grid, or the lower slots may be offset relative to the upper for acceptance of direct radiation which resides in a path oblique to the plane of the grid. In either case the angle θ is an angle, between the medial ray 17 and the most oblique rays 18 which are still capable of passing through the slot, whose tangent is not greater than substantially .25.

It is to be understood that there is some latitude in the value of the tangent of the angle θ, but if it be substantially greater than .25, then as the tangent gradually is increased there is a pronounced increase in the obscuring of the image and likewise the decreasing of the angle results in a diminishment in the improvement of results.

Figure 5:
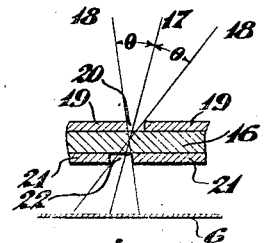
Figure 5 shows another modified form of grid comprised of strips arranged relative to one another.

The grid shown in Figure 5 is an assembly of grid strips of the type shown in Figures 3 and 4 mounted on a carrier which is transparent to X-rays. This grid is of the type adapted to commercial usage though it actually may contain a substantially greater number of strips than those shown in the figure. However, in the central portion of the grid the strips are of the type shown in Figure 3, and the medial lines passing through the slots in this zone of the grid are substantially perpendicular to the plane of the grid.

At the endwise portions the grids are of the type shown in Figure 4 and the medial lines passing through the slots in these endwise zones are oblique to the plane of the grid and opposite to one another to facilitate the acceptance of the direct rays at the border portions of the field of emanation from the tube.

The carrier 23 shown in Figure 5 may be of composition board, for instance, of an eighth or a quarter of an inch in thickness, or other suitable material likewise of suitable thickness, and the grid strips may be cemented to the carrier, for instance, by means of a resinous cement. One feature of the grids of the type shown in Figures 3 and 4 is that the central channels provided in them enable clamping elements to be inserted therein for pressing the grids upon the backing, without danger of damaging or altering the configuration of the grids at their edges. Spacers transparent to X-rays may desirably be employed between the grid strips to locate them accurately relative to one another.

Having described our invention, we claim:

1. A kymograph grid which is comprised of material opaque to X-rays, said grid having a plurality of slots spaced equidistantly apart from one another through which X-rays are free to pass, the slots being of such width and profile relative to the thickness of the opaque material bounding the slots that the greatest angle between a line passing medially through any slot and the most oblique path along which an X-ray may travel and still pass through the slot is an angle whose tangent is not substantially greater than .25.

2. A kymograph grid comprising a plurality of strips of material which are opaque to X-rays, said strips of material being of equal width and being spaced apart from one another to provide slots therebetween through which X-rays may pass, the said slots being of such width relative to the thickness of the strips of material bounding the slots that the greatest angle between a line passing medially through any slot and the most oblique path along which an X-ray may travel and still pass through that slot is an angle whose tangent is less than .25.

3. A kymograph grid comprising a carrier which is transparent to X-rays, a plurality of strips of material which are opaque to X-rays disposed upon said carrier, said strips being spaced apart to provide slots therebetween through which X-rays may pass, the slots being of such width and profile in relation to the thickness of the strips of opaque material bounding the slots that the greatest angle between a line passing medially through any slot and the most oblique path along which an X-ray may travel in a plane which is substantially perpendicular to the plane of the carrier and still pass through the slot is an angle whose tangent is not substantially greater than .25.

4. A kymograph grid comprising a carrier and a plurality of lead strips disposed upon the carrier in spaced relationship to provide slots therebetween, with at least an adjacent pair of lead strips having their marginal edges oppositely tapered to such an extent that the greatest angle between a line passing medially through the slot between said pair of strips and the most oblique path along which an X-ray may travel and still pass through said slot is an angle whose tangent is less than approximately .25.

5. A kymograph grid comprising a plurality of lead strips which are spaced apart from one another in parallel relationship to provide slots therebetween through which X-rays may pass, the central portions of said strips being of lesser thickness than the edgewise portions, and the edgewise portions of such strips being of such thickness relative to the width of the slots between the strips that the greatest angle between a line passing medially through any given slot and the most oblique path along which an X-ray may travel and still pass through the slot in a plane substantially perpendicular to the plane in which the strips reside is an angle whose tangent is not substantially greater than .25.

6. A kymograph grid comprising a plurality of strips of lead arranged in spaced parallel relationship to provide slots therebetween through which X-rays may pass, the strips of a pair defining a slot therebetween having their edgewise portions oppositely chamfered over a portion of the strip thicknesses, the degree of chamfering being related to the slot width and the strip thickness in such manner that the greatest angle between a line passing medially through the slot and the most oblique path along which an X-ray may travel and still pass through the slot is an angle whose tangent is not greater than substantially .25.

7. A kymograph grid comprising a plurality of lead strips arranged in spaced parallel relationship to define slots therebetween, one of said strips having an edgewise portion cut away at its front face, the edgewise portion of an adjacent strip being cut away at its rear face so that the walls of the slot defined by said strips converge with respect to one another toward the rear face, the convergence of the walls being related to the thickness of the strips and the width of the slot at its narrowest dimension in such manner that the greatest angle between a line drawn medially of the slot and the oblique path along which an X-ray may travel and still pass through the slot is an angle whose tangent is not greater than .25.

8. A kymograph grid comprising a plurality of lead strips arranged in spaced parallel relationship to define slots therebetween through which X-rays may pass, the edgewise portions of adjacent strips being configurated so that the walls of the slots therebetween are of converging nature, the dimensions of the slots and strips being controlled to exclude from passage through the slots all X-rays entering the slots on an angle whose tangent relative to a line drawn medially of the slots is greater than approximately .25.

9. A kymograph grid being comprised of a plurality of lead strips arranged in spaced parallel relationship to provide slots therebetween through which X-rays may pass, the edgewise portions of the slots being configurated to permit of the passage of direct X-rays diverging from the focus of an X-ray tube, but with the edgewise portions of the slots also being configurated relative to the width of the slots and the thickness of the strips which bound them in such manner that the greatest angle between a line drawn medially of any given slot and the most oblique path along which secondary X-ray emanations may travel and still pass through the slot is an angle whose tangent is not substantially greater than .25.

CARL K. GIERINGER.
ELBERT E. GREENBERG.